(12) United States Patent
McCullough

(10) Patent No.: US 6,783,716 B2
(45) Date of Patent: Aug. 31, 2004

(54) NOZZLE INSERT FOR LONG FIBER COMPOUNDING

(75) Inventor: Kevin A. McCullough, N. Kingstown, RI (US)

(73) Assignee: Cool Options, Inc., Warwick, RI (US)

( * ) Notice: Subject to any disclaimer, the term of this patent is extended or adjusted under 35 U.S.C. 154(b) by 324 days.

(21) Appl. No.: 09/951,805

(22) Filed: Sep. 13, 2001

(65) Prior Publication Data

US 2002/0041049 A1 Apr. 11, 2002

Related U.S. Application Data

(60) Provisional application No. 60/236,486, filed on Sep. 29, 2000.

(51) Int. Cl.$^7$ .............................................. B29C 47/02
(52) U.S. Cl. ........................... 264/171.13; 264/171.14; 264/171.15; 264/172.11; 264/172.15; 264/177.1; 264/177.2; 264/271.1
(58) Field of Search ....................... 264/171.13, 171.14, 264/172.11, 172.15, 177.1, 177.2, 271.1, 143, 149, 211.22, 145, 148, 171.1, 211.11; 425/71, 567, 568, 122, 462

(56) References Cited

U.S. PATENT DOCUMENTS

| | | | |
|---|---|---|---|
| 2,096,347 A | 10/1937 | Short ............................ 18/13 |
| 2,371,709 A | 3/1945 | Rineer ........................... 18/12 |
| 2,979,431 A | 4/1961 | Perrault ..................... 154/2.24 |
| 3,429,003 A | 2/1969 | Heider et al. .................. 18/12 |
| 3,508,297 A | 4/1970 | Portelli .......................... 18/13 |
| 3,526,692 A | 9/1970 | Onaka ......................... 264/209 |
| 3,574,810 A | 4/1971 | Tournery et al. ............ 264/173 |
| 3,682,749 A | 8/1972 | Schrenk ...................... 156/500 |
| 3,694,131 A | * 9/1972 | Stuart ........................ 425/461 |
| 3,813,199 A | * 5/1974 | Friesner ...................... 425/113 |
| 3,947,172 A | * 3/1976 | Myers ......................... 425/113 |
| 4,100,013 A | * 7/1978 | Medler et al. ............... 156/441 |
| 4,690,628 A | * 9/1987 | Dehennau et al. ....... 425/133.5 |
| 4,864,964 A | * 9/1989 | Hilakos ....................... 118/117 |
| 4,883,625 A | * 11/1989 | Glemet et al. .............. 264/136 |
| 5,002,712 A | * 3/1991 | Goldmann et al. ..... 264/171.13 |
| 5,076,872 A | * 12/1991 | Nakagawa et al. .......... 156/166 |
| 5,358,570 A | * 10/1994 | Drawbaugh ................. 118/404 |
| 5,433,419 A | * 7/1995 | Murakami ................... 264/136 |
| 5,545,297 A | * 8/1996 | Andersen et al. ........... 264/102 |
| 5,672,303 A | * 9/1997 | Metzger et al. ................ 264/75 |
| 5,686,128 A | * 11/1997 | Tracy et al. ................. 426/284 |
| 5,788,908 A | * 8/1998 | Murakami ................... 264/136 |
| 6,077,062 A | 6/2000 | Guillemette et al. ........ 425/113 |
| 2001/0033928 A1 | * 10/2001 | Kadowaki et al. .......... 428/361 |
| 2002/0180095 A1 | * 12/2002 | Berard ........................ 264/143 |

* cited by examiner

Primary Examiner—Michael P. Colaianni
Assistant Examiner—Monica A. Fontaine
(74) Attorney, Agent, or Firm—Barlow, Josephs & Holmes, Ltd.

(57) ABSTRACT

A new die insert for an extrusion machine and a method of using the invention that includes a continuous strand of fiber reinforcing material to be statically drawn directly to the center of the molten flow of polymer base matrix. The insert is placed in line with the discharge end of an injection molding apparatus. A molten flow of polymer base matrix proceeds in a straight linear fashion through the die. A fiber feed tube is centered on the interior of the die. As the polymer flows past the feed tube the molten polymer draws a continuous strand of fiber reinforcing into the center of the flow. The polymer is then extruded and cooled and the extrusion is further pelletized to produce injection molding feed stock material having continuous fiber reinforcing. The result provides a continuous extrusion process that allows the formation of a continuous fiber-reinforced product employing brittle fibers in one-step process.

4 Claims, 3 Drawing Sheets

NOZZLE INSERT FOR LONG FIBER COMPOUNDING

CROSS-REFERENCE TO RELATED APPLICATION

This application is related to and claims priority from co-pending provisional application No. 60/236,486, filed Sep. 29, 2000.

BACKGROUND OF THE INVENTION

The present invention relates to an improved method and device for producing plastic feed material containing long, parallel and aligned fibers for use in injection molding. More specifically, this invention relates to a die insert for an extrusion machine that inserts continuous fibers directly into the polymer feed material.

In the heat sink industries, it has been well known to employ metallic materials for thermal conductivity applications, such as heat dissipation for cooling semiconductor device packages. For these applications, such as heat sinks, the metallic material typically is tooled or machined from bulk metals into the desired configuration. However, such metallic conductive articles are typically very heavy, costly to machine and are susceptible to corrosion. Further, the geometries of machined metallic heat dissipating articles are very limited to the inherent limitations associated with the machining or tooling process. As a result, the requirement of use of metallic materials which are machined into the desired form, place severe limitations on heat sink design particular when it is known that certain geometries, simply by virtue of their design, realize better efficiency but are not attainable due to the limitations in machining metallic articles.

It is widely known in the prior art that improving the overall geometry of a heat-dissipating article can greatly enhance the overall performance of the article even if the material is the same. Therefore, the need for improved heat sink geometries necessitated an alternative to the machining of bulk metallic materials. To meet this need, attempts have been made in the prior art to provide molded compositions that include conductive filler material therein to provide the necessary thermal conductivity. The ability to mold a conductive composite enabled the design of more complex part geometries to realize improved performance of the part.

The attempts in the prior art included the employment of a polymer base matrix loaded with a granular material, such as boron nitride grains. Also, attempts have been made to provide a polymer base matrix loaded with long fibrous filler materials. These attempts are, indeed, moldable into complex geometries but still do not approach the desired performance levels found in metallic machined parts. In addition, known conductive plastic materials are undesirable because they are typically very expensive to manufacture because they employ very expensive filler materials. Still further, these conductive composite materials must be molded with extreme precision due to concerns of filler alignment during the molding process. Even with precision molding and design, inherent problems of fluid turbulence, collisions with the mold due to complex product geometries make it impossible to position the filler ideally thus causing the composition to perform far less than desirable.

Moreover, the typical injection molding process employs a pelletized thermosetting polymer feed stock. This creates further complication in the use of long fibrous fillers for several reasons. If the fibers are incorporated into the polymer at the time of injection molding the part by mixing the fibers into the base polymer during the melting process many of the fibers are broken by the turbulence of the mixing process. Further, if preformed pellet feed stock containing fiber filler is used the length of fibers contained therein are often shorter than the entire length of the pellet material and have an unpredictable overall length distribution. This is typically the result because the pellets are formed using the method described above where random length filler fibers are added to the base matrix material and mixed by a destructive screw or auger and then injection molded into a strand that is pelletized providing a fiber distribution throughout the feed pellet of random lengths with virtually all of the fibers being shorter than the overall length of the pellet.

Another process used for of adding continuous, parallel and aligned fiber reinforcing to the center of a plastic product involves pulling the fiber over several directional rollers, through some form of resin bath containing a molten polymer to fully wet the fibers and subsequently through a heating process and a final forming die. This method of feeding the fibers, however, requires multiple steps employing large equipment and is difficult to use when the fibers to be incorporated are brittle and susceptible to frequent breakage thus causing a great deal of machine down time and interruptions in the continuity of the fiber within the product. Although many types of reinforcing fiber can withstand this process and be incorporated into a final product that satisfies the final desired result of a fiber reinforced product, the type of fiber that must be incorporated in to the plastic in the field of thermally conductive plastics is very application specific and tends to be brittle.

In view of the foregoing, there is a demand for a composite material that is reinforced with continuous fibrous filler. In addition, there is a demand for a method of producing a composite feed stock material that contains continuous fiber reinforcing that can be further molded or cast into complex product geometries. There is also a demand for a pelletized injection molding feed stock material and a method of manufacturing that material that exhibits thermal conductivity as close as possible to purely metallic conductive materials while being relatively low in cost to manufacture.

SUMMARY OF THE INVENTION

In this regard, the present invention provides for a new die insert for an extrusion machine that allows a continuous strand of fiber reinforcing material to be statically drawn directly to the center of the molten flow of polymer base matrix. The insert is placed in line with the discharge end of an injection molding apparatus. The pressure injected molten flow of polymer base matrix proceeds in a straight linear fashion from the input end to the output end of the die. A fiber feed tube is placed in the die insert having an input end on the exterior of the die and an outlet end in the center of the polymer product flow.

As the base polymer flows past the outlet end of the feed tube the molten polymer comes into contact with the reinforcing fiber and fully wets out the fiber. As the molten polymer flows further down the die insert it begins to cool and become more viscous causing the polymer flow to begin to pull on the fiber reinforcing located at its center. This feeding action, caused by the cooling polymer, provides two advantages. First, it allows the fiber material to be placed into the polymer without having to be subjected to the pulling forces and multiple directional changes required under the current technology. Also, the fiber feed action is generated further downstream in a cooling section of the injection molding die, as the polymer begins to harden, thus pulling on the fiber strand (now polymer reinforced) and drawing new, brittle and unreinforced fibers into the still molten injection fed polymer material. In the field of thermally conductive plastic, this is an important feature in that it allows brittle fibers such as carbon fiber to be incorporated into the feedstock in relatively long intact continuous lengths. The result provides a continuous extrusion process that allows the formation of a continuous fiber-reinforced product employing brittle fibers in one-step process.

The material thus produced is then processed further by cutting the material with a pelletizing machine. The length at which the pellets are cut can be tailored to provide reinforcing fibers of the desired length. The pellets thus produced are of a high quality as required for use as feedstock in the injection molding of thermally conductive polymer parts where there is a need for high aspect ratio thermally conductive filler materials such a carbon fiber. Alternatively, the reinforced polymer may be injected directly into a mold cavity for forming a part.

Accordingly, among the objects of the instant invention is a device for producing pelletized injection molding feedstock having continuous reinforcing fibers therein. Another object of the present invention the provision of a low cost method for producing injection molding pellets having continuous thermally conductive fibers extending along the entire length of each of the pellets. Another object of the present invention is a device for producing a fiber reinforced polymer structure where the fiber is incorporated into the flow of polymer material using the static force of the polymer flow.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
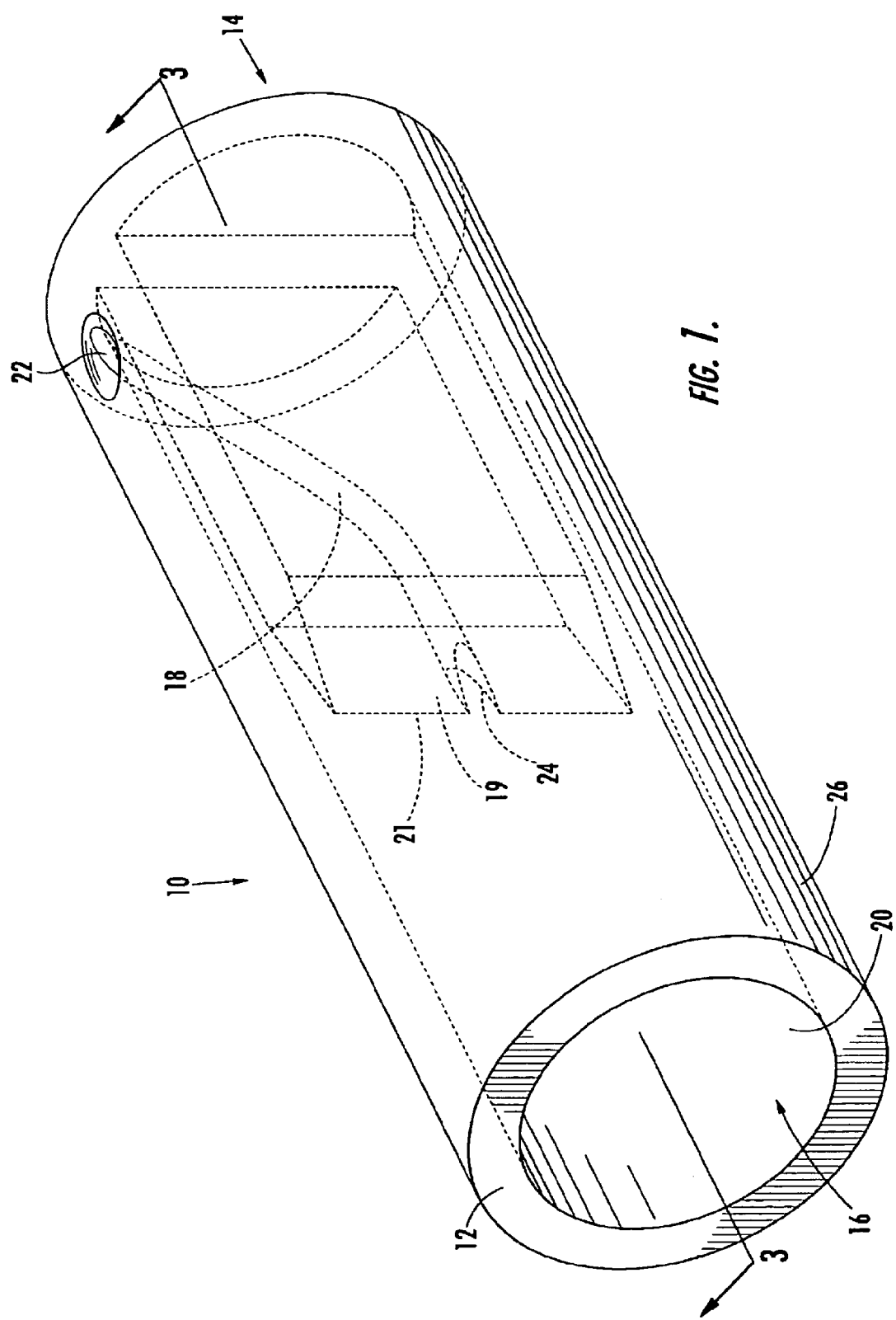
FIG. 1 is a perspective view of the injection-molding die of the present invention.
Figure 2:
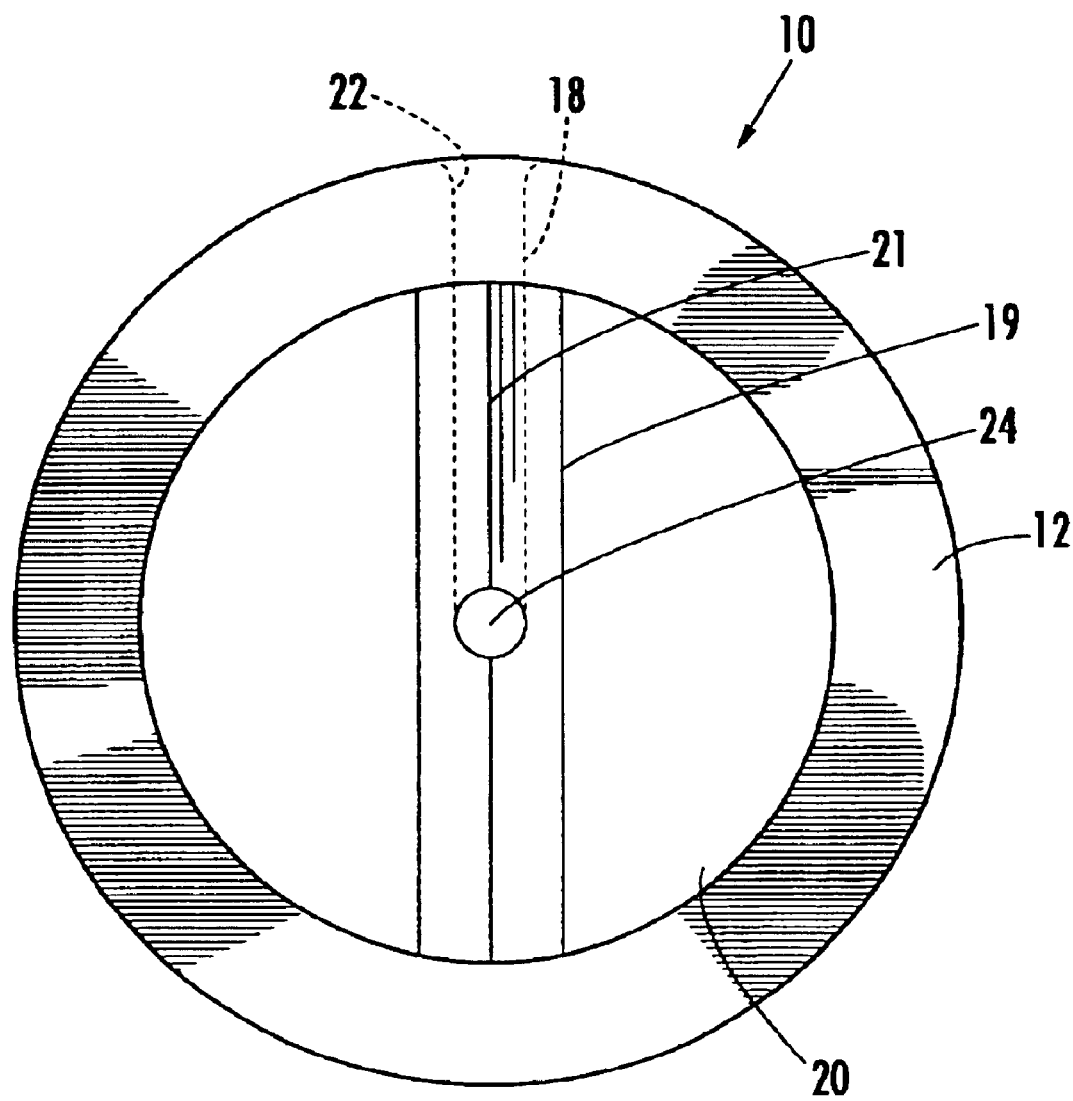
FIG. 2 is a front view thereof.
Figure 3:
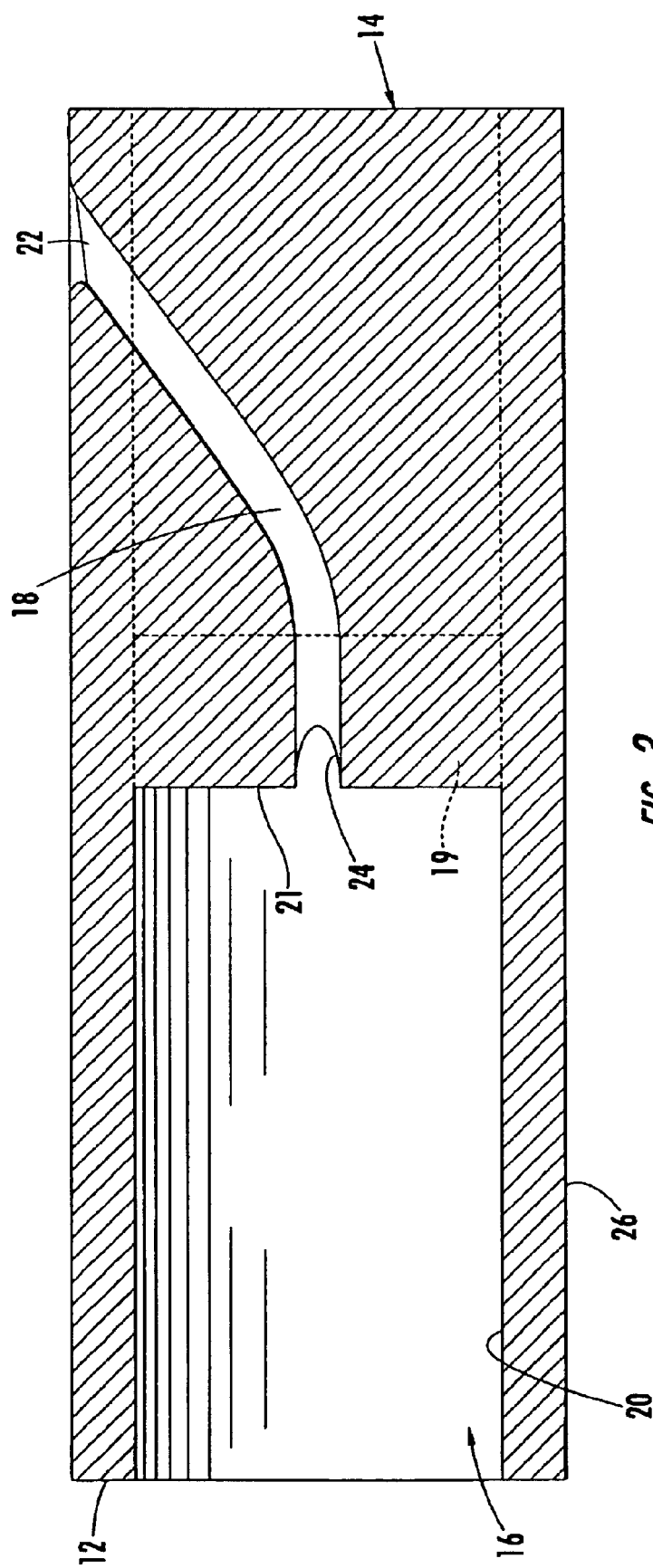
FIG. 3 is a cross sectional view along the line 3—3 of FIG. 1.
Figure 4:
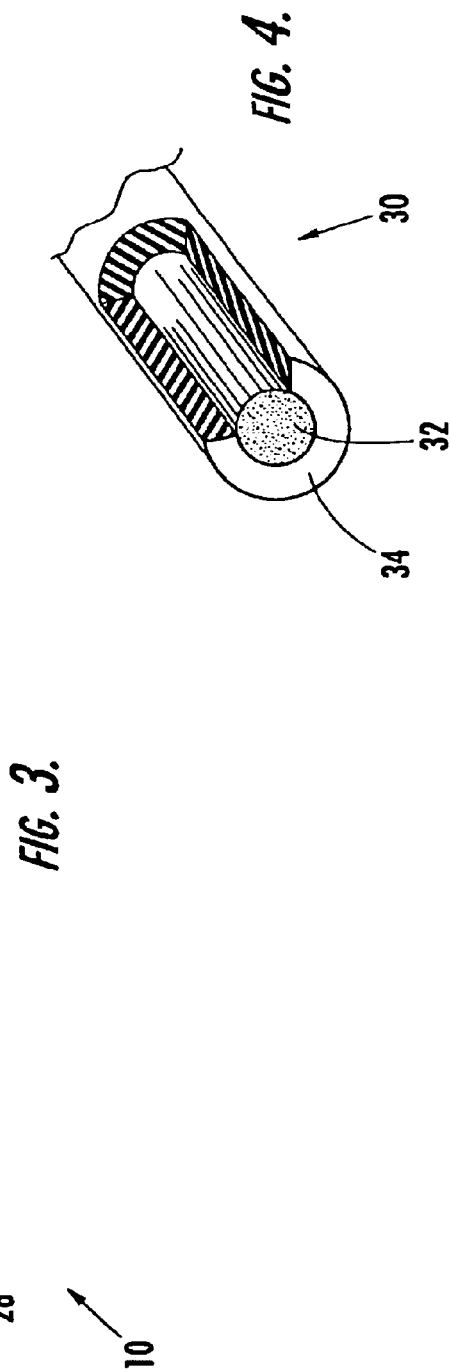
FIG. 4 is a partially cut away perspective view of a pellet formed in accordance with the present invention.

Referring now to the drawings, the injection molding head of the instant invention is illustrated and generally indicated at 10 in FIGS. 1–3. As will hereinafter be more fully described, the instant invention provides for the formation of thermoplastic bodies 30, as shown in FIG. 4, having continuous fiber 32 reinforcing throughout the body 30. The device and method of the present invention allow the incorporation of continuous brittle reinforcing fibers 32 into a thermoplastic extrusion while maintaining the continuity of the fibers 32.

The injection molding die 10 comprises an outer wall 12, an input end 14, an output end 16, a fiber feed tube 18 in a septum 19 leading from the outer wall 12 to the center of the interior of the die 20 and a cooling section 26 adjacent to the output end 16 of the die 10. The die 10 is designed to be used in conjunction with an injection molding apparatus such as an injection-molding barrel and plunger assembly (not shown). The input end 14 of the die is coupled onto the output end of the injection-molding barrel and receives a pressurized flow of molten thermoplastic polymer base The thermoplastic polymer 34 is heated so as to melt uniformly and have a low enough viscosity to allow it to flow freely through the injection molding die 10.

The leading end of a reinforcing fiber 32 is inserted into the outer opening 22 of the fiber feed tube 18 in septum 19 and through the discharge end 24 of the tube 18 into the injection cavity 20 of the die 10. The beveled edge 21 facilitates introduction of the fiber 32 into the molten flow of polymer 34. The discharge end 24 of the tube 18 is placed on the inside 20 of the die 10 so that the fiber 32 is centered in the cross section of the injection profile. The preferred use of the present invention is to produce thermally conductive plastic feedstock material 30 for use in net shape molding of thermally conductive plastic parts. The fiber reinforcing 32 used in the present invention therefore is typically carbon fiber. Carbon fiber material is highly thermally conductive and when employed as a filler in highly filled polymer compositions imparts a high level of thermal conductivity to the completed part. The drawback however is that the carbon fiber is brittle and susceptible to breaking when handled. The present invention provides a manner for producing injection-molding feedstock 30 that incorporates relatively long pieces of carbon fiber 32 while reinforcing them to reduce the amount of breakage during subsequent handling and molding operations.

For this application, the feedstock 30 preferably includes fiber 32 of a pitch-based carbon fiber in a liquid crystal polymer base. Such materials are preferred for forming feed stock material 30 for thermally conductive applications. Other materials may be employed and still be within the scope of the present invention. For example, PAN-base carbon fiber may be used in a polymer base matrix for high strength applications.

In accordance with the process of the present invention, the leading end of the fiber 32 is inserted into the outer opening 22 of the fiber feed tube 18 and into the interior cavity 20 of the injection-molding die 10. As the molten polymer 34 is injected into the interior cavity 20 molding die 10 it contacts and flows around the fiber 32 near the discharge end 24 of the fiber feed tube 18, wetting out the fiber 32 and forming a protective layer 34 around the outer surface of the fiber 32. The molten polymer 34 further flows along the inner cavity 20 of the injection-molding die 10 into the cooling section 26. When the molten polymer 34 flow reaches the cooling section 26 it progressively begins to become more viscous until, as the material, in the form of feedstock 30, is extruded out of the output end 16 of the die 10 it is solid. As the polymer 34 becomes more viscous, it exerts frictional forces on the wetted reinforcing fiber 32 drawing the leading end of the fiber 32 along with the extruded material and drawing more fiber 32 into the molten flow of polymer 34.

It is an important feature of the present invention that the pulling force that draws the fiber 32 into the die cavity 20 is exerted in the cooling section 26 of the die 10. If the fiber 32 is pushed into the die cavity 20 or pulled immediately at its point of entry into the die cavity 20 a high rate of fiber breakage is encountered. By first wetting the fiber 32 and allowing the molten polymer 34 to cool, the fiber 32 upon which the force is acting is polymer reinforced thus protecting the brittle fiber from breaking. In addition, the pulling force is being exerted by the resistance of the flow of a generally soft polymer material 34*l* as it cools rather that a firm mechanical process. As a result, as seen in FIG. 4, the material 30 extruded from the output end 16 of the die 10 has continuous strands of carbon fiber 32 throughout the entire length of the extrusion 30.

Another important feature of the present invention is the fact that the fiber feed tube 18 in septum 19 is aligned in a parallel relationship with the flow of molten polymer 34 through the die cavity 20. Since the carbon fiber reinforcing material 32 is very brittle, it is susceptible to breakage each time it is required to change direction. In the present invention, it proceeds directly off of the spool (not shown) and into the molding cavity 20 in a linear fashion by proceeding first into the outer opening 22 of the fiber feed tube 18 and out of the output end 24 of the feed tube 18. The pulling force of the molten plastic 34 material is exerted in the same linear direction as the fiber feed direction. In addition, there is very little turbulence encountered in the flow of the molten polymer 34 as it flows through the injection die 10 of the present invention because it flows through the die in a linear fashion rather that having to enter the die and turn 90° as was required in the prior art injection molds. This lack of turbulence and linear feed arrangement greatly reduces the possibility of breaking the reinforcing fibers 32 and preserves the continuity of the fiber-reinforcing 32.

Once the extruded feedstock 30 is cooled it is further fed into a conventional pelletizing device as is well know in the prior art. The extruded material 30 is cut, using the appropriate blades known in the art, into reinforced polymer pellets 30 of a desired length having continuous fiber reinforcing 32 corresponding to the overall length of the pellet 30. The pellets 30 are the extrusions 30 as described above but cut to length. For case of illustration, the pellets and the extrusions are both generally referenced as 30. This is an advantage over prior art compositions and methods that use strands of discontinuous length fibers to extrude a product that is further pelletized. In the prior art cases, there is no way of predicting the length of fiber within the finished pellet and in a high percentage of the distribution the length of the fibers are less that the overall length of the pellet.

It can therefore be seen that the instant invention provides a novel device for forming thermoplastic bodies having continuous fiber reinforcing throughout their entire length. The linear feed arrangement in combination with the arrangement whereby the drawing force is exerted on the fiber only after it has been reinforced provides a unique process that results in a higher consistency product while using brittle reinforcing fibers that are susceptible to breakage.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of producing polymer material with a continuous fiber core suitable for use as feed stock in a subsequent injection molding process comprising:

providing a molten base polymer matrix;

providing a continuous strand of thermally conductive fiber having a leading end;

providing an injection molding head having an input end, an output end, a linear bore having a linear longitudinal axis extending between said input end and said output end, a septum wall bifurcating said bore defining two separate flow channels within said bore, said septum wall having a trailing edge, a fiber feed tube extending through said septum wall with an input end on the exterior of said head and an output end on the interior of said bore centrally located on said trailing edge of said septum wall and a cooling section adjacent to said output end;

inserting the leading and of said thermally conductive fiber strand through said fiber feed tube into said injection molding head; and injecting said polymer matrix into said bore in a continuous linear flow, the direction of said linear flow being aligned with said linear longitudinal axis of said bore, whereby said septum wall separates said linear flow into said two separate flows within said two flow channels and aligns and smoothes said two continuous flows to eliminate turbulence, wherein said two continuous linear non-turbulent flows of molten polymer rejoin to form a single flow at said trailing edge of said septum wall impregnates said thermally conductive fiber strand and upon reaching said cooling section said molten polymer flow cools and becomes more viscous drawing said continuous thermally conductive fiber strand further into said injection molding hand.

2. The method of claim 1 further comprising the step of pelletizing said cooled flow of polymer.

3. The method of claim 1 where said step of providing a continuous strand of thermally conductive fiber further comprises providing a strand of carbon fiber.

4. The method of claim 1 where said fiber feed tube is aligned in a linear fashion with the flow of molten polymer material.

* * * * *